(12) United States Patent
Obata

(10) Patent No.: US 6,595,667 B1
(45) Date of Patent: Jul. 22, 2003

(54) INSTRUMENT

(75) Inventor: Masato Obata, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/831,875

(22) PCT Filed: Sep. 20, 2000

(86) PCT No.: PCT/JP00/06453

§ 371 (c)(1),
(2), (4) Date: May 16, 2001

(87) PCT Pub. No.: WO01/23842

PCT Pub. Date: Apr. 5, 2001

(30) Foreign Application Priority Data

Sep. 29, 1999 (JP) ............................................. 11-276395
Nov. 26, 1999 (JP) ............................................. 11-335213
Dec. 17, 1999 (JP) ............................................. 11-358437

(51) Int. Cl.$^7$ .............................. B60Q 1/00; B60Q 1/26
(52) U.S. Cl. ............................ 362/489; 362/26; 362/27; 362/29; 362/30
(58) Field of Search ............................. 362/26, 27, 29, 362/30, 489

(56) References Cited

U.S. PATENT DOCUMENTS

| | | | | |
|---|---|---|---|---|
| 4,258,643 A | * | 3/1981 | Ishikawa et al. | 116/286 |
| 5,047,761 A | * | 9/1991 | Sell | 340/815.1 |
| 5,678,912 A | * | 10/1997 | Ayres et al. | 362/23 |
| 5,911,492 A | * | 6/1999 | Perry et al. | 362/26 |
| 6,025,820 A | * | 2/2000 | Salmon et al. | 345/75 |
| 6,065,846 A | * | 5/2000 | Kato et al. | 362/30 |
| 6,182,601 B1 | * | 2/2001 | Baatz | 116/288 |
| 6,213,613 B1 | * | 4/2001 | Muller | 362/23 |
| 6,217,182 B1 | * | 4/2001 | Shepherd et al. | 362/23 |
| 6,302,551 B1 | * | 10/2001 | Matumoto | 362/27 |
| 6,352,356 B1 | * | 3/2002 | Noll | 362/260 |

FOREIGN PATENT DOCUMENTS

| | | |
|---|---|---|
| JP | 5-33020 | 4/1993 |
| JP | 5-248896 | 9/1993 |
| JP | 7-47868 | 2/1995 |
| JP | 7-113663 | 5/1995 |
| JP | 8-233613 | 9/1996 |
| JP | 9-21655 | 1/1997 |
| JP | 9-105649 | 4/1997 |
| JP | 10-281820 | 10/1998 |
| JP | 11-101666 | 4/1999 |
| JP | 11-132794 | 5/1999 |
| JP | 11-160111 | 6/1999 |

* cited by examiner

Primary Examiner—Sandra O'Shea
Assistant Examiner—Jacob Y. Choi
(74) Attorney, Agent, or Firm—McDermott, Will & Emery

(57) ABSTRACT

A measuring apparatus in which the necessity of a light conductor for illuminating the front panel can be eliminated and cost reduction and slimming is realized, comprising: a circuit board 1; an instrument body 3 disposed on the circuit board 1 and including a drive shaft 2 extending forward; a pointer 4 to be fitted on the tip side of the drive shaft 2; a front panel 5 disposed between the pointer 4 and the circuit board 1 for illuminating at least the display portion 52; a light source 6 disposed in front of the circuit board 1 on the side where the drive shaft 2 resides with respect to the display portion 52; a reflector 7 to be disposed between the front panel 5 and the circuit board 1; and the circuit board 1 including a first reflecting portion 75 facing to the light source 6 for reflecting the illumination from the light source 6 toward the outer periphery, and a second reflecting portion 77 extending outward with an appropriate space interposed between itself and the front panel 5 so as to surround the light source 6 for reflecting the illumination toward the front panel 5.

21 Claims, 12 Drawing Sheets

F I G. 1 1
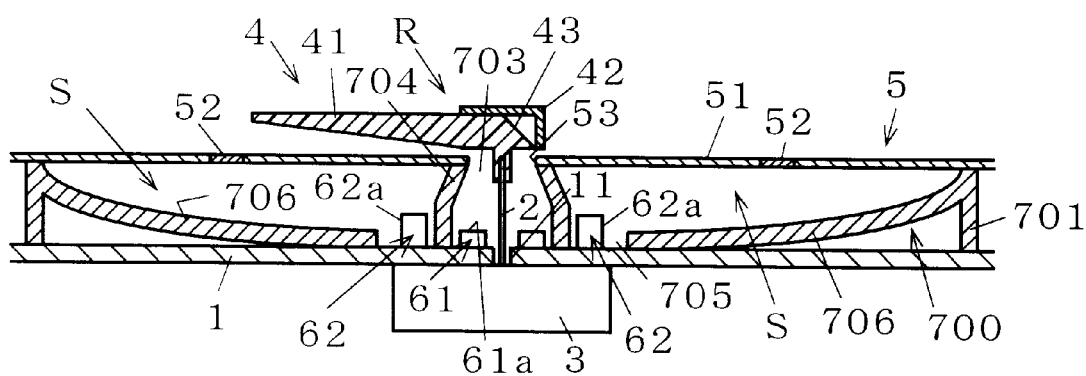
F I G. 1 2
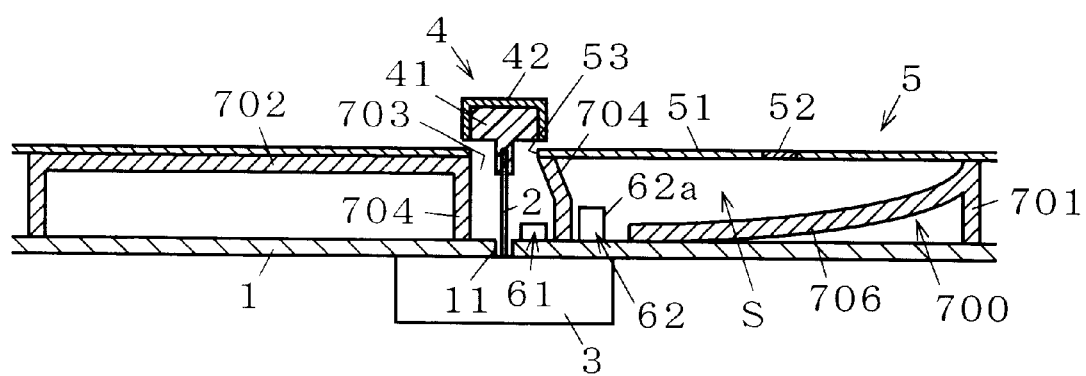

FIG. 13
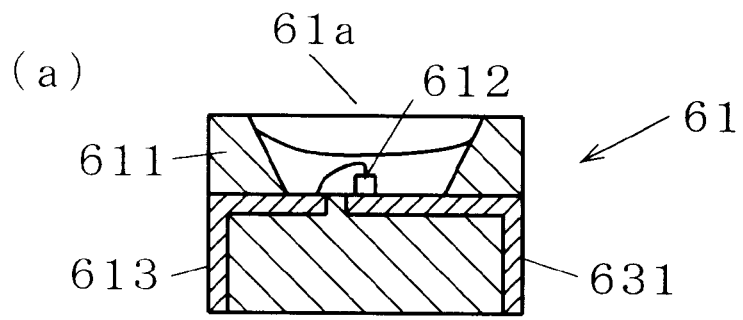
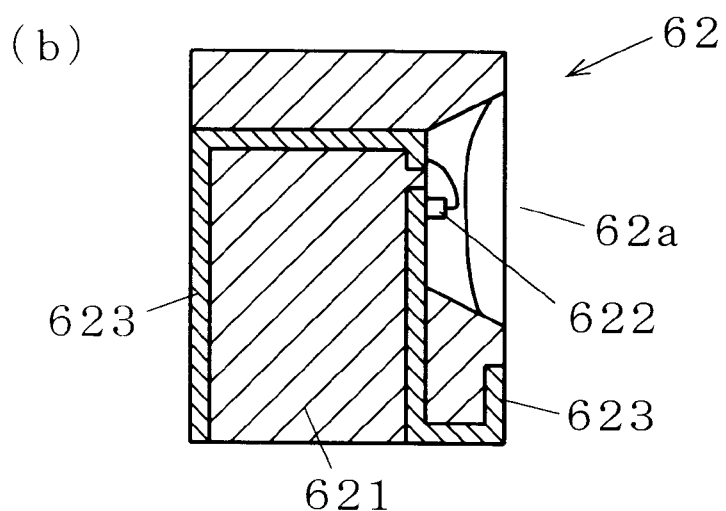
FIG. 14
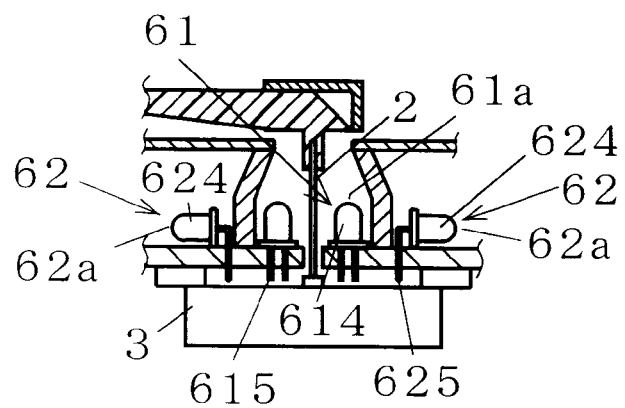

INSTRUMENT

TECHNICAL FIELD

The present invention relates to an instrument apparatus to be mounted, for example, on the vehicle, and more specifically, to a structure of illumination thereof.

BACKGROUND OF THE INVENTION

As an instrument apparatus of this type, the one comprising an instrument body having a projecting drive shaft being mounted on the circuit board, a pointer that gleams with a light supplied from the center of the rotation thereof mounted on the tip of the drive shaft, and a front panel having a translucent display portion such as a scale or letters provided along the orbit of the pointer mounted behind the pointer, wherein the display portion of the front panel and the pointer are illuminated by the light source disposed behind the front panel is known.

More specifically, as shown in the publication of Japanese Patent Laid-Open No.105649/1997 for example, an instrument apparatus comprising an instrument body and a light source being disposed side-by-side in front of the circuit board, a light conductor of a shape bypassing the instrument body disposed behind the front panel, wherein a illuminating light is conducted to behind the front panel by the light conductor to illuminate the display portion (in this case, the pointer is also illuminated by the light conductor) is generally used. Such a structure that has a light conductor is advantageous in that the variations in illumination on the entire display portion can easily be prevented in comparison with the structure in which a plurality of light sources are disposed immediately under the front panel to illuminate the display portion directly (for example, see the publication of Japanese Utility Model Laid-Open No.33020/1993).

As shown in the publication of Japanese Patent Laid-Open No.21655/1997, for example, a structure in which an instrument body is disposed behind the circuit board, and a light source comprising a light emitting diode, a light conductor extending from the area in the vicinity of the drive shaft along the front panel toward the outside, and a reflector for supporting the light conductor from behind are disposed in the area in front of the circuit board (the area in the vicinity of the drive shaft) that is left as a free space because the instrument body is disposed behind thereof, so that the illumination is conducted to the outer periphery of the drive shaft by the light conductor to illuminate the display portion (in this case, the pointer is illuminated simultaneously by a direct light), is also known. Such a structure has many advantages such that the light source and the front panel can be disposed in the vicinity with each other by placing the instrument body behind the circuit board, that an uniform and blight illumination is realized while slimming the entire structure of illumination by providing a light conductor of a plate shape between the reflector and the front panel, and so on.

However, the instrument apparatuses shown in the publications of Japanese Patent Laid-open No.105649/1997 and Japanese Patent Laid-Open No.21655/1997 are both require the light conductor, and thus there is recognized problem in that the cost of parts and the weight of the entire apparatus increase and the structure of illumination in creases in complexity correspondingly. In addition, in the instrument apparatus shown in these publications, simply eliminating the light conductor may result in variations in illumination or lowering of luminance, thereby lowering the quality of the illumination significantly.

With these circumstanced in view, an object of the present invention is to provide an instrument apparatus in which at least a light conductive body can be eliminated for illumination of the front panel by improving the structure of illumination, so that weight reduction can be achieved at low cost.

DISCLOSURE OF THE INVENTION

The instrument apparatus of the present invention comprises: a circuit board; an instrument body disposed on the circuit board and provided with a drive shaft extending forward; a pointer to be fitted on the tip side of the drive shaft; a front panel disposed between the pointer and the circuit board and including a display portion having a scale, characters, and the like corresponding to the pointer; a light source disposed at the position in front of the circuit board and the inside (on the side where the drive shaft resides) with respect to the display portion, for illuminating the display portion; and a reflector to be disposed between the front panel and the circuit board. The reflector is formed with a first reflecting portion at the position facing to the light source in the direction of the axis of the drive shaft for reflecting a light from the light source toward the outer periphery, and with a second reflecting portion disposed outside (the position of the outer periphery) of the first reflecting portion extending outwardly with an airspace interposed between itself and the front panel so as to surround the light source for reflecting the illumination reflected from the first reflecting portion toward the front panel, so that the illumination conducted by the second reflecting portion illuminates the display portion.

In this manner, by illuminating the front panel (display portion) via the first and the second reflecting portion of the reflector, the front panel can be brightly and almost uniformly illuminated without using the light conductor. Therefore, a satisfactory quality of the illumination is achieved, and thus the light conductor can be eliminated for illuminating the front panel, thereby realizing cost reduction and weight reduction.

The light source is preferably disposed at a prescribed distance away from the display portion toward the side where the drive shaft resides, and the second reflecting portion is formed so as to cover the area behind the front panel including the display portion.

In the instrument apparatus of the present invention, illumination of the pointer may also be accomplished by disposing the instrument body behind the circuit board with the drive shaft passed through the circuit board, constructing the pointer of a light-emitting pointer that emits a light upon reception of the light supply from the center of rotation thereof, forming the front panel with a through hole for exposing the center of rotation of the pointer; disposing the light source at the position corresponding to the through hole, and forming the reflector with a opening at the position corresponding to the through hole for allowing the illumination to pass through and advance toward the center of rotation of the pointer.

In this case, since a light from the light source illuminates the display portion of the front panel via the first and the second reflecting portion of the reflector, and simultaneously, illuminates the pointer via the opening of the reflector and the through hole of the front panel, the light conductor can be eliminated not only for illuminating the front panel, but also for illuminating the pointer. In addition, since a common light source can be used for illuminate the front panel and the pointer, the necessity to specifically provide a light source for the pointer may be eliminated, thereby realizing cost reduction and weight reduction.

The light source may be disposed so as to face to the first reflecting portion in the direction of the axis of drive shaft, at the position where the illumination can be supplied toward the pointer through the opening of the reflector and the through hole of the front panel. By providing a cylindrical portion on the reflector within the first reflecting portion so as to surround the opening, the illumination from the light source can be guided toward the pointer, thereby increasing efficiency to illuminate the pointer.

The instrument apparatus of the present invention may also be constructed by disposing the instrument body behind the circuit board with the drive shaft passed through the circuit board, constructing the pointer of a light-emitting pointer that emits a light upon reception of the light supply from the center of the rotation thereof, forming the front panel with a through hole for exposing the center of rotation of the pointer, disposing a first light source for illuminating the pointer at the position corresponding to the through hole on the front side of the circuit board, disposing the second light source for illuminating the display portion at the position outside with respect to the first light source and on the side where the drive shaft resides (the inside) with respect to the display portion, providing the reflector with an opening for allowing the illumination from the first light source to pass through toward the center of rotation of the pointer, with a first reflecting portion facing to the second light source and reflecting the illumination from the second light source toward the outer periphery thereof, and with a second reflecting portion extending outwardly with an airspace interposed between itself and the front panel so as to surround the second light source for reflecting the illumination reflected from the first reflecting portion toward the front panel, so that the display portion and the pointer are simultaneously illuminated.

In this case, since the illumination from the first light source reaches the center of rotation of the pointer through the opening on the reflector and the through hole on the front panel to illuminate the pointer, and the illumination emitted from the second light source reaches the display portion of the front panel through the first and the second reflecting portion on the reflector to illuminate the display portion, the light conductor can be eliminated not only for illuminating the front panel, but also for illuminating the pointer, thereby realizing cost reduction and weight reduction. In addition, since the first and second light sources are provided for illuminating the front panel and the pointer respectively, the quantity of light reaching the front panel and the pointer may be increased, thereby increasing the illuminating luminance.

In this structure as well, the second light source is preferably disposed at a prescribed distance away from the display portion on the side where the drive shaft resides, and the second reflecting portion is formed so as to cover at least the area behind the front panel including a display portion.

When the first source for illuminating the pointer and the second light source for illuminating the front panel are provided as described above, by providing a partition surrounding the opening and extending in the direction of the axis of the drive shaft on the reflector so that the first light source and the second light source are separated by the partition, the partition can serve as a light guide portion for guiding the illumination from the first light source to the pointer to increase the illuminating efficiency of the pointer. When the reflector has a cylindrical portion surrounding the opening, the partition can be formed from the cylindrical portion continuously. In this case, it is also possible to provide the first reflecting portion on the partition. In such a structure, the structure of the reflector can be simplified.

In the structures described above, preferably, the first reflecting portion is inclined by a prescribed angle with respect to the front panel to form of an inclined surface or an inclined curved surface for reflecting a light from the light source toward the outer periphery (toward the second reflecting portion). In this case, by forming the inclined surface or the inclined curved surface constituting the first reflecting portion into a conical shape surrounding the drive shaft, a light from the light source can be reflected toward the outer periphery in good balance. The first reflecting portion can also be formed separately from the reflector.

In the structures described above, the second reflecting portion is preferably formed of an inclined surface or the inclined curved surface that approaches said front panel with the distance from the center. However, by providing the inclined surface or the inclined curved surface constituting the second reflecting portion so that the inclined angle with respect to the front panel increases with the distance from the center, the front panel can be illuminated more uniformly.

The instrument apparatus of the present invention comprises: a circuit board; an instrument body disposed on the circuit board and provided with a drive shaft extending forward; a pointer to be fitted on the tip side of the drive shaft; a front panel disposed between the pointer and the circuit board and including a display portion having a scale, characters, and the like corresponding to the pointer; a light source disposed at the position in front of the circuit board and the inside (the side where the drive shaft resides) with respect to the display portion, for illuminating the display portion, and a reflector to be disposed between the front panel and the circuit board. The light source is held by the circuit board in such a manner that the light-emitting portion faces toward the opposite side (outside) with respect to the side where the drive shaft resides, and the reflector is formed with a reflecting portion extending outwardly so as to surround the light source with an airspace interposed between itself and the front panel for reflecting the illumination emitted from the light-emitting portion toward the front panel, so that the illumination reflected on the reflecting portion reaches the front panel through the airspace to illuminate the display portion.

In this manner, the front panel can be illuminated brightly and almost uniformly without using the light conductor by reflecting the illumination from the light source of which the light-emitting portion faces toward the opposite side from the side where the drive shaft resides through the reflecting portion of the reflector. Therefore, a satisfactory quality of illumination can be realized, and thus the light concudtor can be eliminated for illuminating the front panel, thereby realizing cost reduction and weight reduction.

In the instrument apparatus of the present invention, but not limited to this structure, it is preferable to provide a plurality of light sources for illuminating the front panel (second light sources) on the concentric circles with the drive shaft as a center. With such an arrangement, bright and well-balanced illumination can be achieved.

The instrument apparatus of the present invention comprises: a circuit board; an instrument body disposed on the circuit board and provided with a drive shaft extending forward; a pointer to be fitted on the tip side of the drive shaft and emitting a light upon reception of the light supply from the center of rotation; a front panel disposed between the pointer and the circuit board and including a display portion corresponding to the pointer and a through hole for exposing the center of rotation of the pointer; a first light source disposed in front of the circuit board at the position corresponding to the through hole for illuminating the pointer; a second light source disposed outside with respect to the first light source in front of the circuit board but on the side where the drive shaft resides with respect to the display portion for illuminating the display portion; and a reflector disposed between the front panel and the circuit board. The first light source for illuminating the pointer is held on the circuit board in such a manner that the light-emitting portion faces toward the pointer (the front), and the second light source for illuminating the front panel is held by the circuit board in such a manner that the light-emitting portion faces toward the side where the drive shaft resides (the outside). On the other hand, the reflector is formed with an opening at the position corresponding to the through hole for allowing the illumination from the first light source for illuminating the pointer to pass through toward the center of rotation of the pointer and with a reflecting portion extending outward with an airspace interposed between itself and the front panel so as to surround the second light source for illuminating the front panel for reflecting the illuminating light from the second light source toward said front panel.

In such a manner, by illuminating the pointer by allowing the illumination from the first light source of which the light-emitting portion faces toward the pointer reach the center of rotation of the pointer through the opening on the reflector and the through hole of the front panel, and by illuminating the front panel by allowing the illumination from the second light source of which the light-emitting portion faces opposite from the side where the drive shaft resides to reach the front panel after reflecting on the reflecting portion of the reflector, the light conductor can be eliminated not only for illuminating the front panel, but also for illuminating the pointer, thereby realizing cost reduction and weight reduction. In addition, specifically providing the first and the second light sources for the front panel and the pointer respectively enables to increase the quantity of light reaching the front panel and the pointer respectively, thereby increasing the illuminating luminance.

In this case, when the reflecting portion is formed of an inclined surface or the inclined curved surface that approaches the front panel with the distance from the center thereof, the illuminating efficiency can be increased. In such a case, providing the inclined surface or the inclined curved surface constituting the reflecting portion so that the inclined angle with respect to the front panel increases with the distance from the center is advantageous to obtain a uniform illumination on the front panel.

When a partition surrounding the opening and extending in the direction of the axis of the drive shaft is provided on the reflector so that the first light source and the second light source are separated by the partition, the partition can serve as a light guide portion for guiding the illumination from the first light source to the pointer to increase the illuminating efficiency of the pointer.

In the instrument apparatus of the present invention, but not limited to this structure, when the first light source for illuminating the pointer and the second light source for illuminating the front panel are provided, it is preferable to provide a plurality of first and second light sources on the concentric circles with the drive shaft as a center. With such an arrangement, bright and well-balanced illumination can be achieved.

When the color of emitted light is different between the first light source and the second light source, employment of the partition for separating the first light source and the second light source is effective, because the partition can prevent interference of the colors of emitted lights from the respective light sources.

In the instrument apparatus of the present invention, when the first reflecting portion and the second reflecting portion are provided on the reflector, a reflecting film for enhancing the reflectivity of light may be provided on any one of the area of the front panel facing to the first reflecting portion or the same facing to the second reflecting portion. When providing only a reflecting portion on the reflector, a reflecting film for enhancing the reflectivity of light may be provided on the area of the front panel facing to the reflecting portion.

Since the reflecting film is provided in this way, the illumination supplied to the front panel may be increased to increase the illuminating luminance, thereby enabling the uniform and bright illumination.

When forming a reflecting film on the front panel, the illuminating efficiency can be increased by forming the reflecting film so as to avoid the area of display portion and to closely surround the display portion. Employing the reflecting film in a metallic color is advantageous to increase the efficiency of light reflection, and in this case, the efficiency of the light reflection can further be increased by forming the surface of the reflecting film in a mirror-finished surface. As a metallic color, a silver color has little effect on the color of the illumination and is good in general versatility. As a method of forming the reflecting film, for example, any suitable means such as vapor deposition, plating, painting and coating, printing, transcription, adhesion of light-reflex-processed film or a plate may be employed. However, in the case of providing a reflecting film on the front panel, formation by printing is most suitable.

In the instrument apparatus of the present invention, an arbitrary type of a movement for instrument may be employed as an instrument body. However, by arranging the instrument body behind the circuit board so that the drive shaft passes through the circuit board and extends forward, the body portion of the instrument body is not placed in front of the circuit board, and thus the flexibility of the layout of the light sources (first and second light sources) is enhanced. Such an arrangement of the instrument body is especially effective for the structure in which the light source is disposed behind the center of rotation of the pointer.

In the instrument apparatus of the present invention, the reflector may be formed of desired material such as a metal having a light reflecting property, a synthetic resin, and the like. However, forming the reflector of a synthetic resin of whitish color is effective for achieving the effective illumination or weight reduction, and in addition, the reflecting efficiency may be increased by forming the wall surface of the reflector into a glossy surface.

In the instrument apparatus of the present invention, though the light source, or the first and the second light sources may employ an arbitrary light emitting element, a light-emitting diode is preferable, in view of the directivity, the heat build-up, and the effect to the environment.

In the instrument apparatus of the present invention, since the front side of the front panel is covered with the semi-translucent panel of a dark color, at least the illuminated image on the front panel can be shown in high contrast against the dark background, and thus a quality appearance is added and marketability may be enhanced despite of it slow cost and light weight.

BRIEF DESCRIPTION OF THE DRAWINGS

FIG. 1 to FIG. 5 show a first embodiment of the present invention, in which FIG. 1 is an exploded perspective view of the instrument apparatus; FIG. 2 is a plan view showing the assembled state of the instrument apparatus of FIG. 1; FIG. 3 is a perspective view of the reflector; FIG. 4 is a cross sectional view taken along the line A—A in FIG. 2; and FIG. 5 is a cross sectional view taken along the line B—B in FIG. 2. FIG. 11 is a cross sectional view taken along the line A—A in FIG. 9; FIG. 12 is a cross sectional view taken along the line B—B in FIG. 9; and FIGS. 13($a$), ($b$) are cross sectional views showing the internal structure of the light source. FIG. 14 is a cross sectional view of the principal portion showing the fifth embodiment of the present invention. FIG. 15 to FIG. 17 show the sixth embodiment of the present invention, in which FIG. 15 is a cross sectional view of the instrument apparatus; FIG. 16 is an enlarged cross sectional view of the area shown by the arrow P1 in FIG. 15; and FIG. 17 is an enlarged cross sectional view of the area shown by the arrow P2 in FIG. 15. FIG. 19 and FIG. 20 show the eighth embodiment of the present invention, in which FIG. 19 is a plan view showing the principal portion on the front side of the instrument apparatus; and FIG. 20 is a cross sectional view taken along the line A—A in FIG. 19.

BEST MODE FOR CARRYING OUT THE INVENTION

Referring now to FIG. 1 to FIG. 5, the first embodiment of the present invention will be described.

Figure 1:
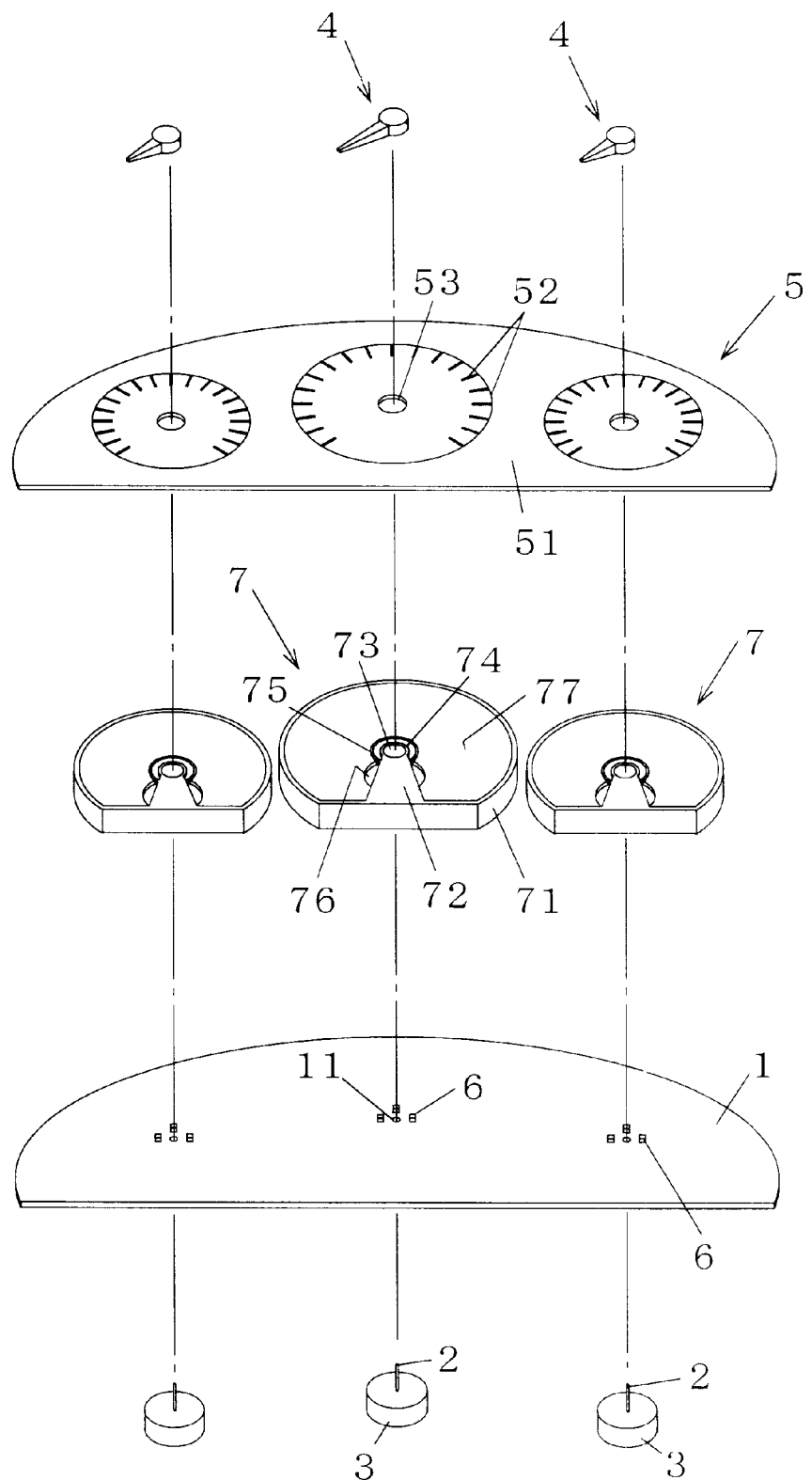
Figure 2:
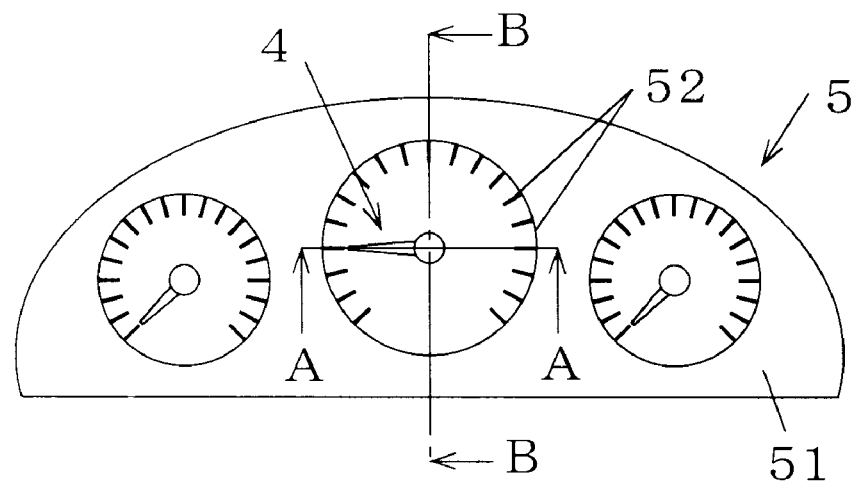

In FIG. 1, the instrument apparatus of the first embodiment of the present invention comprises; a circuit board 1; an instrument body 3 conductively fixed to the circuit board 1 and including a drive shaft 2 extending forward; a pointer 4 to be fitted on the tip side of the drive shaft 2; a front panel 5 disposed between the pointer 4 and the circuit board 1; a light source 6 disposed in front of the circuit board 1 in the vicinity around the drive shaft 2, and the reflector 7 disposed between the front panel 5 and the circuit board 1.

The circuit board 1 is formed, for example, of a hard circuit board formed by applying a wiring pattern (not shown) on a glass epoxy substrate, and drive means (not shown) for driving and controlling the instrument body 3 and various circuit components (not shown) such as a resistance, a condenser, and the like for example are conductively connected to said wiring pattern.

The instrument body 3 comprises a moving magnet type instrument or a stepping motor, which is fitted behind the circuit board 1 so that the driving shaft 2 pass through the shaft hole 11 formed on the circuit board 1, and is electrically connected to said wiring pattern (said drive means) by means of a suitable conductive means such as soldering or the like.

Figure 4:
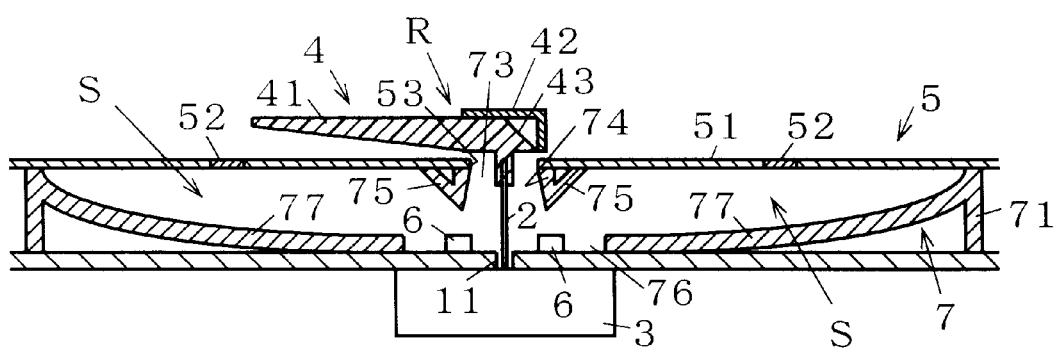

The pointer 4 comprises, as shown in FIG. 4 specifically later, a indicating portion 41 formed of a translucent synthetic resin, and a cover 42 for covering the outer periphery of the center of rotation R of the indicating portion 41, wherein the indicating portion 41 extends linearly along the front panel 5, and the center of rotation R is formed with a light-receiving reflecting portion 43 that receives a light emitted from the light source 6 disposed behind and reflects and conducts the received illumination toward the tip portion thereof.

The front panel 5 is a thin plate substrate formed of a translucent synthetic resin (not shown) having a ground color portion 51 of light-blocking ink and a display portion 52 of translucent coloring ink, in which only the display portion 52 is formed to have a translucency, and the display portion 52 includes a scale and characters arranged along the orbit of the pointer 4 as the objects of indication, and a through hole 53 for exposing the center of rotation R of the pointer 4 is formed at the position corresponding to the drive shaft 2.

The light source 6 comprises for example a chip-type light-emitting diodes, and a plurality of chip-type light-emitting diodes are arranged in front of the circuit board 1 and a prescribed distance away from the display portion 52 of the front panel 5 on the side where the drive shaft 2 resides, in this case, a plurality of chip-type light-emitting diodes are arranged in the vicinity of margins of the shaft hole 11 or the drive shaft 2, and a plurality of the same are arranged on the concentric circles with the drive shaft 2 as a center at almost regular intervals.

Figure 3:
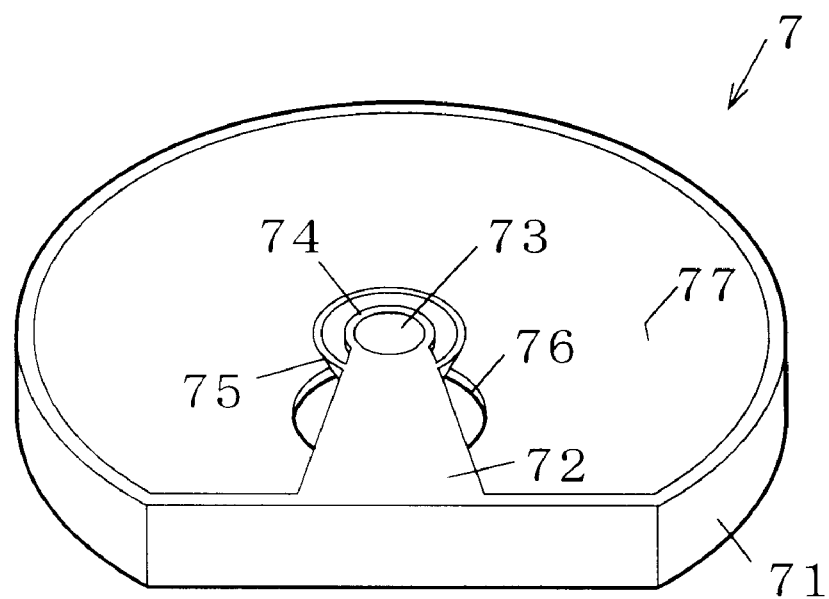
Figure 5:
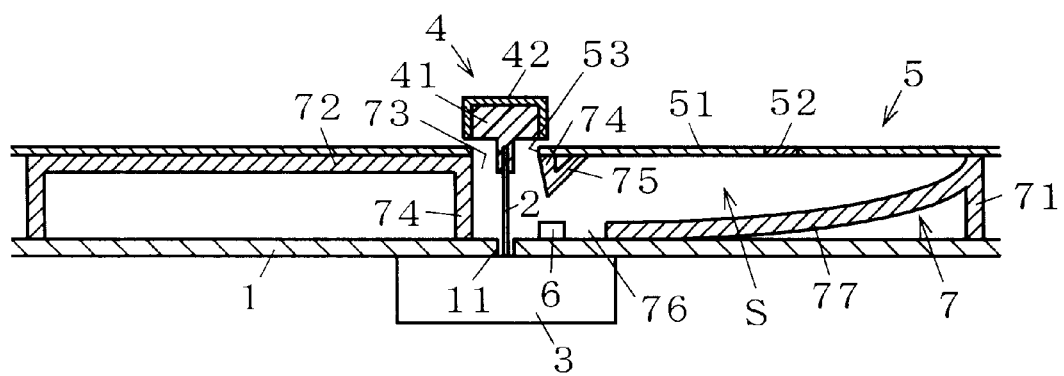

The reflector 7 is an injection-molded body formed of a whitish synthetic resin in the shape of a case, and, as shown in FIG. 3 to FIG. 5, comprises a peripheral wall portion 71 formed into an annular shape corresponding to the shape of arrangement of the display portion 52 on the front panel 5, a extending portion 72 extending from the front side of the peripheral wall portion 71 partially along the front panel 5 toward the center (toward the drive shaft 2), a cylindrical portion 74 supported by the extending portion 72 and having an opening 73 at the position corresponding to the through hole 53 on the front panel 5, and a first reflecting portion 75 extending from the rear end of the cylindrical portion 74 in the oblique direction so as to surround the cylindrical portion 74 at a prescribed distance and to face to the light source 6, an annular opening 76 formed on the bottom side at the position corresponding to the first reflecting portion 75 and the cylindrical portion 74 and serving as a die-cut hole when the first reflecting portion 75 and the cylindrical portion 74 are molded, and a second reflecting portion 77 extending from the front side of the peripheral wall portion 71 except for the extending portion 72 in the direction toward the light source 6 (toward the side of the opening).

In this case, at least the inner surface of the outer wall surface of the cylindrical portion 74, the outer wall surface of the first reflecting portion 75 on the side of the light source 6, and the outer wall surface of the second reflecting portion 77 on the side of the front panel 5 are formed into a glossy surface by surface polishing of the forming die or clear coating after molding. Though a plurality of reflectors 7 are provided corresponding to the number of the instrument bodies 3 in this embodiment, the plurality of reflectors 7 may be formed into a single piece unit.

The cylindrical portion 74 extend s toward the light source 6 along the axis of the drive shaft 2 so as to surround the opening 73, and serves to guide the illumination from the light source 6 passing through the opening 73 to the front side (to the side where the pointer 4 resides) and conduct to the center of rotation R of the pointer 4.

The first reflecting portion 75 is formed of an inclined surface of almost conical shape the diameter of which is larger on the side of the front panel 5 and smaller on the side of the light source 6 so as to surround the cylindrical portion 73, and faces toward the light source 6 at a prescribed distance. The inclined angle is set to about 45 degrees with respect to the surface of the front panel 5 and formed so as to reflect the illumination from the light source 6 toward the outer periphery (toward the second reflecting portion 77). The first reflecting portion 75 is supported together with the cylindrical portion 74 by the extending portion 72, and the cross section thereof is approximately V-shape as shown in FIG. 4 and FIG. 5.

The second reflecting portion 77 is a inclined surface extending toward outside (front side of the peripheral wall portion 71) with an airspace S interposed between itself and the front panel 5 so as to surround the light source 6 and approaching the front panel 5 with the distance from the center, and is formed into a curved surface (inclined curved surface) the inclined angle of which with respect to the front panel 5 increase with the distance from the center, so as to reflect the illumination reflected from the first reflecting portion 75 toward the front panel 5. The second reflecting portion 77 and the first reflecting portion 75 are separated by the portion corresponding to the light source 6 (opening 76) so as to allow the direct light from the light source 6 and the reflecting light reflected from the first reflecting portion 75 to pass through toward the outer periphery, or toward the second reflecting portion 77. Since the first and second reflecting portions 75, 77 are separated with respect to each other, the airspace S continues to the light source 6 (the first reflecting portion 75), and consequently, three components of the first reflecting portion 75, the second reflecting portion 77, and the airspace S constitute the illumination chamber that conduct the illumination from the light source 6 toward the front panel 5.

In this case, the light source 6 is arranged at the position where it can supply the illumination through the opening 73 and the through hole 53 to the center of rotation R (light-receiving reflecting portion 43) of the pointer 4, and, simultaneously, a light through the first and the second reflecting portions 75, 77 to the front panel 5 (display portion 52).

In such an arrangement, when the light source 6 emits a light, a part of the illumination is reflected by the first reflecting portion 75 of the reflector 7 toward the outer periphery (toward the second reflecting portion 77), and the illumination reached the second reflecting portion 77 is again reflected by the second reflecting portion 77 toward the front panel 5, whereby the display portion 52 arranged corresponding to the orbit of the pointer 4 is illuminated brightly and almost uniformly, and a part of the illumination of the light source 6 is supplied through the opening 73 of the reflector 7 and the through hole 53 of the front panel 5 to the center of rotation R (light-receiving reflecting portion 43) of the pointer 4, thereby illuminating the indicating portion 41 of the pointer 4 over the whole rotating range thereof.

As is described thus far, according to this embodiment, by providing a circuit board 1, an instrument body 3 disposed on the circuit board 1 with a drive shaft 2 extended forward, a pointer 4 to be fitted to the tip of the drive shaft 2, a front panel 5 disposed between the pointer 4 and the circuit board 1 and having a display portion 52 corresponding to the pointer 4, a light source 6 disposed in front of the circuit board 1, or on the side of the drive shaft 2 with respect to the display portion 52 for illuminating at least the display portion 52, and a reflector 7 to be disposed between the front panel 5 and the circuit board 1, and providing the reflector 7 further with a first reflecting portion 75 facing to the light source 6 to reflect the illumination from the light source 6 toward the outer periphery and with a second reflecting portion 77 extending outward with an airspace S interposed between itself and the front panel 5 so as to surround the light source 6 for reflecting the illumination toward the front panel 5, the front panel 5 can be illuminated brightly and almost uniformly, thereby ensuring the satisfactory quality of the illumination, which enables the elimination of the light conductor for illuminating the front panel and achievement of cost reduction and weight reduction.

In addition, since such an illuminating structure is applied, specifically designed dimming means for the uniformity of illumination (for example, disposition of a diffusion plate behind the front panel 5 or printing of a dimming mask on the front panel 5 itself) are not necessary, thereby contributing significantly to cost reduction.

Since it is constructed in such a manner that the illumination is reflected on the first reflecting portion 75 toward the outer periphery, the distance between the front panel 5 and the circuit board 1 can be reduced, which is advantageous for slimming of the apparatus.

According to this embodiment, in addition to the illuminating structure of the front panel 5 as described above, since the instrument body 3 is disposed behind the circuit board 1 so that the drive shaft 2 is passed through the circuit board 1, constructing the pointer 4 of a light-emitting pointer that emits a light upon reception of the light supply from the center of rotation R, forming a through hole 53 for exposing the center of rotation R of the pointer 4 on the front panel 5, disposing the light source 6 at the position corresponding to the through hole 53, and providing the reflector 7 with an opening 73 for allowing the illumination to pass through toward the center of rotation R of the pointer 4 at the position corresponding to the through hole 53, the pointer 4 can be illuminated through the opening 73 on the reflector 7 and the through hole 53 on the front panel 5, whereby the light conductor can be eliminated not only for illuminating the front panel 5, but also for illuminating the pointer 4, and a common light source 6 can be used for illuminating the front panel 5 and the pointer 4, thereby eliminating the necessity of specifically providing a separate light source for the pointer, and thus achieving cost reduction and weight reduction.

Though an example in which both of the front panel 5 and the pointer 4 are illuminated is shown in this embodiment, the illuminating means on the side of the pointer 4 is arbitrary as far as at least the side of the front panel 5 can be illuminated. In addition, though the instrument body 3 is disposed behind the circuit board 1 in this embodiment, the instrument body 3 may be disposed in front of the circuit board 1 if the illumination of the pointer 4 is not specially considered.

In this embodiment, since the reflector 7 with a cylindrical portion 74 is disposed inside of the first reflecting portion 75 and surrounding the opening 73, the illumination from the light source 6 can be guided to the center of rotation R of the pointer 4 effectively, thereby enhancing the illuminating efficiency of the pointer 4.

In this embodiment, since a plurality of light sources 6 is disposed on the concentric circles with the drive shaft 2 as a center, bright and well-balanced illumination can be realized.

In this embodiment, since the first reflecting portion 75 is formed of an inclined surface that is inclined by a prescribed angle with respect to the front panel 5 so as to reflect a light from the light source 6 toward the outer periphery (toward the second reflecting portion 77), and in this case, since the inclined surface constituting the first reflecting portion 75 is formed into an approximately conical shape surrounding the drive shaft 2, a light from the light source 6 can be reflected toward the outer periphery in good balance.

In this embodiment, since the second reflecting portion 77 is formed of an inclined curved surface that approaches the front panel 5 with the distance from the center, and in this case, the inclined curved surface constituting the second reflecting portion is formed so that the inclined angle with respect to the front panel 5 increases with the distance from the center thereof, the front panel 5 can be illuminated more uniformly. The second reflecting portion 77 is not limited to the inclined curved surface, but may be an inclined plane, a combination of a plurality of inclined planes of which the inclined angles with respect to the front panel 5 are different, or a combination of an inclined plane and an inclined curved surface.

In this embodiment, since the reflector 7 is formed of a whitish synthetic resin material, the cost and weight can advantageously be reduced.

Since a glossy surface is employed for the wall surface of the reflector 7, the reflecting efficiency of the reflector 7 can be increased.

Figure 6:
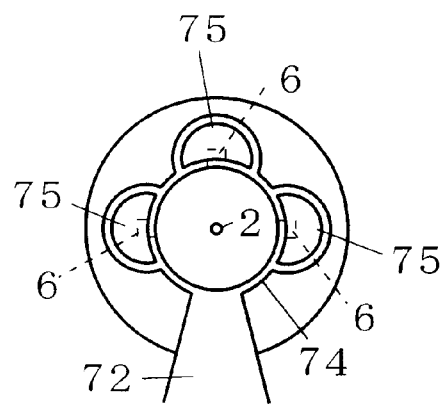
FIG. 6 is a cross sectional view showing the second embodiment of the present invention.

Referring now to FIG. 6, the second embodiment of the present invention will be described.

Incidentally, this embodiment is a modified example of the first reflecting portion in the first embodiment.

In other words, in the first embodiment described above, the first reflecting portion 75 is constructed into a single conical shape supporting for a plurality of (three) light sources 6. However, in this embodiment, the first reflecting portion 75 is formed into a plurality of (three) pieces for supporting the light sources 6 respectively, and each of them is formed into a semi-conical shape so that the respective first reflecting portions 75 face to the respective light sources 6 to reflect the illumination toward the outer periphery. In this arrangement, the same effect as the first embodiment described above is expected.

Figure 7:
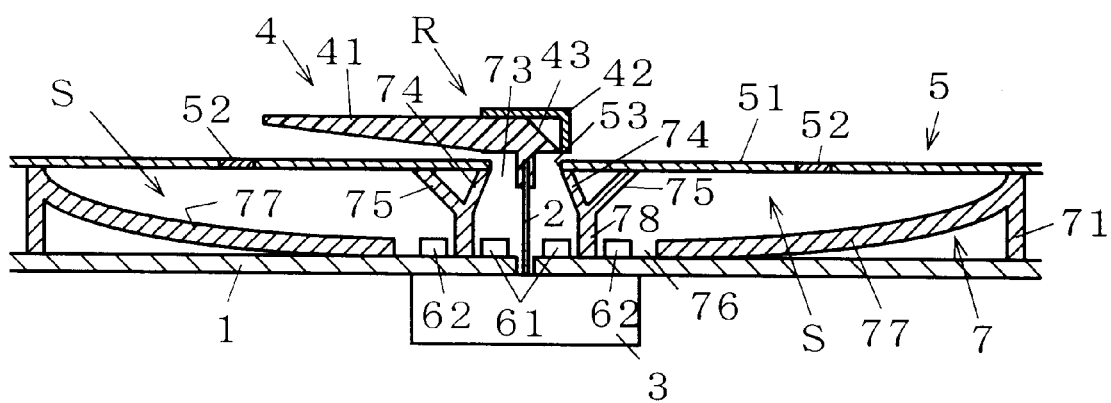
FIG. 7 is a cross sectional view showing the third embodiment of the present invention. From FIG. 8 to FIG. 13 show the fourth embodiment of the present invention.
Figure 8:
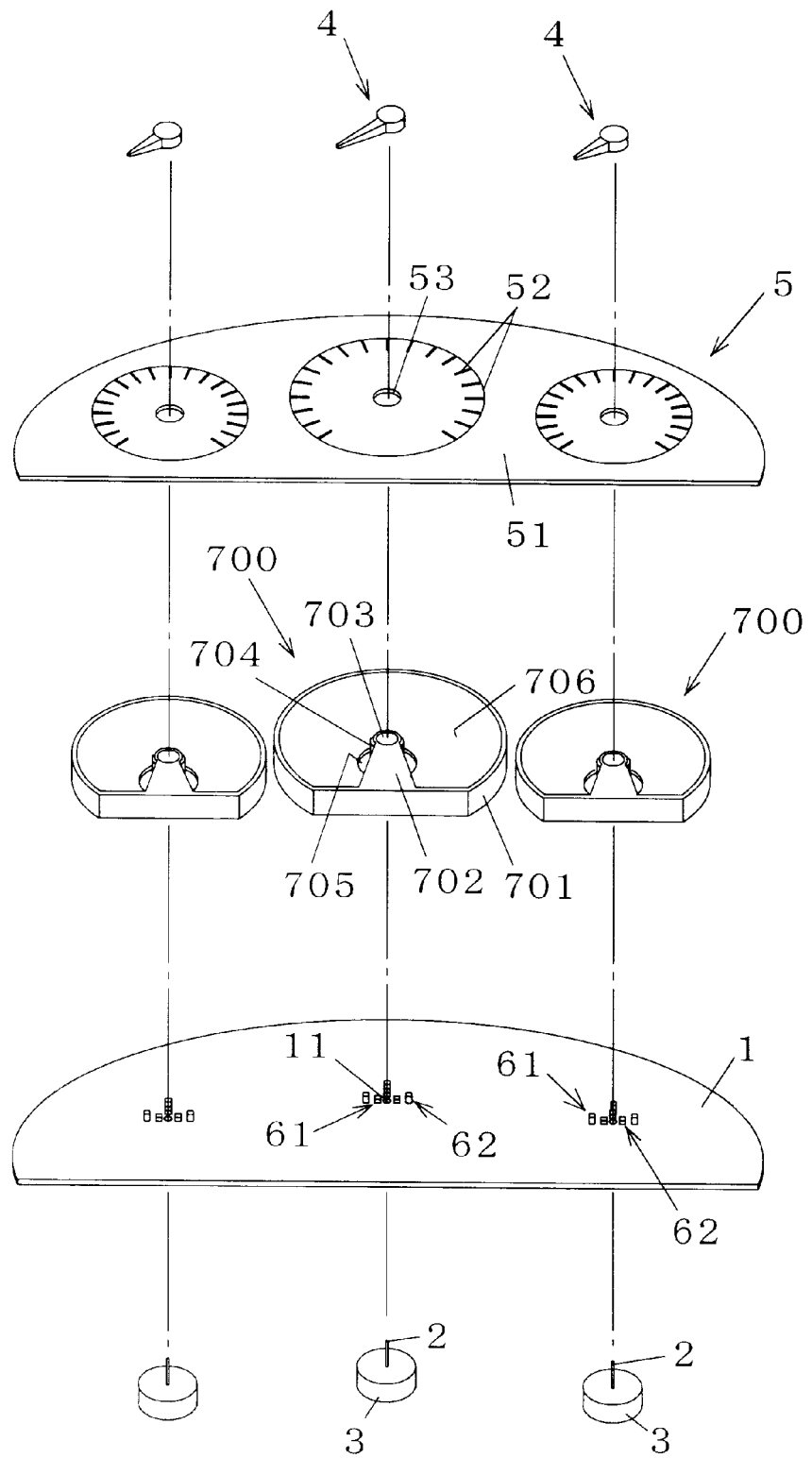
FIG. 8 is an exploded perspective view of the instrument apparatus.
Figure 9:
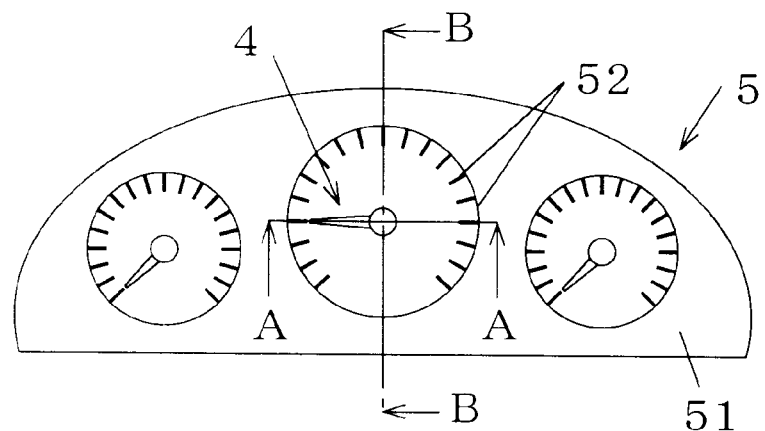
FIG. 9 is a plan view showing the assembled state of the instrument apparatus of FIG. 8.

Referring now to FIG. 7, the third embodiment of the present invention will be described. This embodiment shows the case where each of the front panel and the pointer has a light source specifically provided thereto.

In other words, in this embodiment, the instrument body 3 is disposed behind the circuit board 1 so as to pass the drive shaft 2 through the circuit board 1, the pointer 4 is formed of a light-emitting pointer that emits a light upon reception of the light supply from the center of rotation R, the front panel 5 is formed with a through hole 53 for exposing the center of rotation R of the pointer 4, a first light source 61 for illuminating the pointer 4 is provided on the front side of the circuit board 1 at the position corresponding to the through hole 53, and a second light source 62 for illuminating the display portion 52 is disposed at the position outside the first light source 61 and on the drive shaft side 2 with respect to the display portion 52 (in this case, the position adjacent to the first light source 61).

The reflector 7 is provided with an opening 73 for allowing the illumination from the first light source 61 toward the center of rotation R of the pointer 4 (light-receiving reflecting portion 43), a first reflecting portion 75 facing to the second light source 62 for reflecting the illumination from the second light source toward the outer periphery, and the second reflecting portion 77 extending outward with an appropriate space interposed between itself and the front panel 5 so as to surround the second light source 62 for reflecting toward the front panel 5 the illumination reflected by the first reflecting portion 75, so that the display portion 52 and the pointer 4 are simultaneously illuminated.

In this embodiment in such an arrangement, the illumination from the first light source 61 reaches the center of rotation R of the pointer 4 through the opening 73 on the reflector 7 and the through hole 53 of the front panel 5 to illuminate the pointer 4 (indicating portion 41), and the illumination emitted from the second light source 62 reaches the front panel 5 through the first and the second reflecting portions 75, 77 of the reflector 7 to illuminate the display portion 52, whereby the light conductor can be eliminated not only for illuminating the front panel 5, but also for illuminating the pointer 4, thereby realizing cost reduction and weight reduction. In addition, since the first and the second light source 61 and 62 are provided for the front panel 5 and the pointer 4 respectively, the quantity of light that reaches the front panel 5 and the pointer 4 respectively may be increase, thereby enhancing the illuminating luminance.

In this embodiment, the second light source 62 is preferably disposed at the position on the drive shaft side at a prescribed distance away from the display portion 52, and the second reflecting portion 77 may be formed to cover the area behind the front panel 5 including at least the display portion 52.

This embodiment is constructed in such a manner that a partition 78 extending from the cylindrical portion 74 surrounding the opening 73 is provided continuously in the direction of the axis of drive shaft 2 so that the first light source 61 and the second light source 62 are separated by the partition 78. In this arrangement, the partition 78 together with the cylindrical portion 74 are allowed to serve as a light guiding portion for guiding the illumination from the first light source 61 to the pointer 4, thereby increasing the illumination efficiency of the pointer. Since the partition 78 is provided in such a manner, the cross sections of the cylindrical portion 74 including the partition 78 and the first reflecting portion 75 is approximately Y-shape.

In this embodiment, pluralities of the first and second light sources 61, 62 are arranged respectively on the concentric circles with the drive shaft 2 as a center, thereby a bright and well-balanced illumination can be realized.

As in this embodiment, when the construction in which the first light source 61 and the second light source 62 are separated by the partition 78 (cylindrical portion 74) is employed, the colors of illumination from the first light source 61 and from the second light source 62 may be different from each other, and even these colors are different, the partition 78 can prevent these colors of illumination from the respective light sources 61, 62 from intervening, thereby enhancing the quality of the illumination.

Referring now to FIG. 8 to FIG. 13, the fourth embodiment of the present invention will be described.

As is clear from FIG. 8 to FIG. 12, though the constructions of the circuit board, the instrument body, the pointer, and the front panel are the same as those in the first to third embodiments described above, the constructions of the light source and the reflector differ from the first to third embodiments described above.

In other words, the light sources 61, 62 of this embodiment comprises, as shown in FIG. 11 and FIG. 12f a first light source 61 formed of a chip-type light emitting diode for illuminating the pointer 4, and a second light source 62 formed of a chip-type light-emitting diode for illuminating the display portion 52 of the front panel 5.

These first and second light sources 61, 62 comprises, as shown in FIG. 13(a) and (b), the cases 611, 621 formed of an insulating material, diode chips 612, 622 disposed on the recessed portions on the cases 611, 621, and a pair of leads 613, 623 for supplying electricity to the diode chips 612, 622 fixed by molding on the cases 611, 621, in which the opening side of the recessed portions on the cases 611, 621 serves as light emitting portion 61a, 62a for emitting the illumination.

Three pieces of the first light source 61, from between the first and the second light sources 61, 62 in this arrangement, are disposed in the shaft hole 11 on the circuit board 1 or in the vicinity of the margin of the drive shaft 2 corresponding to the through hole 53 on the front panel 5 as shown in FIG. 11, in such a manner that each of them are located at almost regular intervals on the concentric circles with the drive shaft 2 as a center respectively, in such a manner that the light-emitting portions 61a of these first light sources 61 are conductively fixed (held) by soldering or the like on the front side of the circuit board 1 facing to the center of rotation R of the pointer 4 (upper side of FIG. 11).

On the other hand, three pieces of the second light sources 62 are disposed outside of the first light sources 61 on the side where the drive shaft 2 resides with respect to the display portion 52 in such a manner that each of them are located at almost regular intervals on the concentric circles with the drive shaft 2 as a center respectively, in such a manner that the light-emitting portions 62a of the second light sources 62 are conductively fixed (held) by soldering or the like on the front side of the circuit board 1 facing to the opposite side from the drive shaft 2 (lateral direction in FIG. 11 and FIG. 12). The second light sources 62 are preferably positioned at a prescribed distance away from the display portion 52 on the side where the drive shaft 2 resides.

Figure 10:
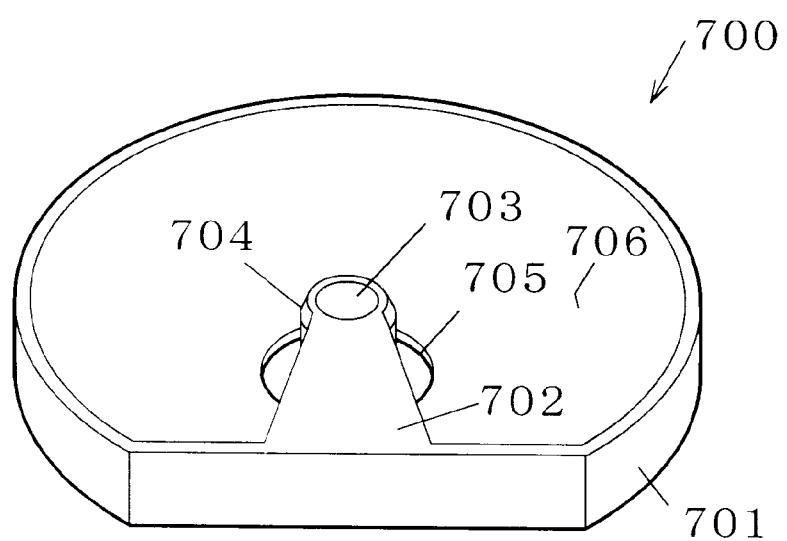
FIG. 10 is a perspective view of the reflector.

In this embodiment, the reflector 700 is formed of an injection-molded body in a whitish synthetic resin in the shape of a case, and as shown in FIGS. 10–12, it comprises a peripheral wall portion 701 formed into an annular shape corresponding to the shape of arrangement of display portion 52 on the front panel 5, an extending portion 702 extending from the front side of the peripheral wall portion 701 partially along the front panel 5 toward the center (toward the drive shaft 2), a cylindrical partition 704 supported by the extending portion 702 and having an opening 703 at the position corresponding to the through hole 53 on the front panel 5, an annular opened portion 705 opening so as to surround the partition 704 to expose the second light source 62 toward the front side, and a reflecting portion 706 extending from the front side of the peripheral wall portion 701 except for the extending portion 702 toward the opened portion 703 (toward the second light source 62).

In this case, at least the inner wall surface of the partition 704 and the outer wall surface of the reflector 706 on the side of the front panel 5 are formed into glossy surfaces by surface polishing of the forming die or clear coating after molding in order to increase the reflectivity of light on these surfaces. In this embodiment, though a plurality of reflectors 700 are arranged corresponding to the number of the instrument bodies 3, the plurality of reflectors 700 may be formed into a single piece unit.

The partition 704 extends toward the circuit board 1 in the direction of the axis of the drive shaft 2 so as to surround the opening 703 to accommodate the first light source 61 therein, and guides the illumination from the light source 61 routed through the opening 703 forward (toward the side of the pointer 4) and conduct it to the center of rotation R of the pointer 4. In this case, the partition 704 serves also to separate the first light source 61 and the second light source 62.

The reflecting portion 706 is an inclined surface extending outward (toward the front side of the peripheral wall portion 701) with an airspace S interposed between itself and the front panel 5 so as to surround the peripheral area of the second light source 62 and approaching the front panel 5 with the distance from the center, and forms a curved surface (inclined curved surface) the inclined angle of which with respect to the front panel 5 increase with the distance from the center, so as to reflect the illumination from the second light source 62, the light-emitting portion 62a of which faces the opposite side from the drive shaft 2, toward the front panel 5. The reflecting portion 706 may be formed so as to cover the area behind the front panel 5 including at least the display portion 52.

In such an arrangement, when the first light source 61 emits a light, the illumination that advanced from the light-emitting portion 61a forward reaches passes through the partition 704 and the opening 703 of the reflector 700, and the through hole 53 on the front panel 5 and reaches the center of rotation R of the pointer 4 (light-receiving portion 43), thereby illuminating the indicating portion 41 of the pointer 4 brightly over the whole rotating range thereof. When the second light source 62 emits a light, the illumination advanced from the light-emitting portion 62a to the opposite side from the drive shaft 2 is reflected by the reflecting portion 706 of the reflector 700 toward the front panel 5, thereby the display portion 52 arranged according to the rotating orbit of the pointer 4 brightly and almost uniformly.

As is described thus far, the instrument apparatus of this embodiment comprises a circuit board 1, an instrument body 3 disposed on the circuit board 1 with a drive shaft 2 extended forward, a pointer 4 to be mounted on the tip side of the drive shaft 2, a front panel 5 disposed between the pointer 4 and the circuit board 1 and having a display portion 52 corresponding to the pointer 4, a light source 62 (the second light source) located on the side of the drive shaft 2 with respect to the display portion 52 in front of the circuit board 1 for illuminating the display portion 52, and a reflector 700 disposed between the front panel 5 and the circuit board 1, in which the light source 62 is held by the circuit board in such a manner that the light-emitting portion 62a thereof faces the opposite side from the drive shaft 2, and the reflector 700 is provided with a reflecting portion 706 extending outward with an airspace S interposed between itself and the front panel 5 so as to surround the light source 62 for reflecting the illumination from the light-emitting portion 62a toward the front panel 5, whereby the front panel 5 can be illuminated brightly and almost uniformly without using the light conductor as in the case of the related art, thereby eliminating the light conductor for illuminating the front panel 5 and realizing cost reduction and weight reduction.

In this embodiment, since the pointer 4 is constructed of a light-emitting pointer that emits a light upon reception of the light supply from the center of rotation R of the pointer 4, a through hole 53 is formed for exposing the center of rotation R of the pointer 4 on the front panel 5, a first light source 61 is provided on the circuit board 1 at the position corresponding to the through hole 53 with the light-emitting portion 61a thereof faced forward, an opening 703 is provided on the reflector 700 at the position corresponding to the through hole 53 for allowing the illumination from the first light source 61 to pass toward the center of rotation R of the pointer 4, and the illumination is supplied through the opening 703 and the through hole 53 on the front panel 5 to the center of rotation R of the pointer 4 to illuminate the pointer 4, the light conductor can be eliminated not only for illuminating the front panel 5, but also illuminating the pointer 4, thereby realizing cost reduction and weight reduction accordingly.

In this embodiment, since the first and second light sources 61, 62 are specifically provided for illuminating both of the front panel 5 and the pointer 4 respectively, the quantity of light that reaches each of the front panel 5 and the pointer 4 may be increased to increase the illuminating luminance.

Since this embodiment is constructed in such a manner that the illumination from the second light source 62 having a light-emitting portion 62a facing to the opposite side from the drive shaft 2 (toward the lateral direction) is reflected through the reflecting portion 706 of the reflector 700 toward the front panel 5 for illuminating the front panel 5, dimming means for rendering the illumination uniform (for example, disposition of a diffusion plate behind the front panel 5 or printing of a dimming mask on the front panel 5 itself) are not specifically necessary, thereby contributing significantly to cost reduction and reducing the distance between the front panel 5 and the circuit board 1, which is advantageous for slimming of the apparatus.

In this embodiment, since the illumination from the first light source 61 can be efficiently guided to the center of rotation R of the pointer 4 by providing a partition 704 on the reflector 700 so as to surround the first light source 61, thereby increasing the illuminating efficiency of the pointer 4.

Since the first light source 61 and the second light source 62 is separated by the partition 704, interference between the illuminations from the first light source 61 and the second light source 62 can be prevented, and when the colors of the emitted light from the first light source 61 and from the second light source 62 differ from each other, interference of the colors with each other can be prevented, thereby enhancing the quality of the illumination.

In this embodiment, since a plurality of first and second light sources 61, 62 disposed on the concentric circles with the drive shaft 2 as a center for illuminating the pointer 4 and the front panel 5, a bright and well-balanced illumination can be realized.

In this embodiment, since the reflecting portion 706 is formed of an inclined curved surface that approaches the front panel 5 with the distance from the center thereof for illuminating the front panel 5, and in this case, the inclined curved surface constituting the reflecting portion 706 is formed so that the inclined angle with respect to the front panel 5 increases with the distance from the center thereof, the front panel 5 can be illuminated more uniformly. Incidentally, the reflecting portion 706 is not limited to the inclined curved surface, but may be an inclined plane, a combination of a plurality of incline planes of which the inclined angle with respect to the front panel 5 are different, or a combination of an inclined plane and an inclined curved surface.

In this embodiment, since the reflector 700 is formed of a whitish synthetic resin material, the cost and weight can advantageously be reduced.

In this embodiment, since a glossy surface is employed for the wall surface of the reflector 7, the reflecting efficiency of the reflector 700 can be increased.

In this embodiment, since the instrument body 3 is not positioned in front of the circuit board 1 because it is disposed behind the circuit board 1 so that the drive shaft 2 passes through the circuit board 1 and extends forward, the flexibility of the layout of the first and the second light sources 61, 62 can be increased.

Referring now to FIG. 14, the fifth embodiment of the present invention will be described.

This embodiment employs the first and the second light source constructed of a mold-type light-emitting diode instead of the first and the second light sources constructed of a chip-type light-emitting diode as in the fourth embodiment.

In other words, the first and the second light sources 61, 62 of this embodiment is constructed in such a manner that diode chips, which are not shown, are sealed in convex lens portions 614, 624 of a translucent material and leads 615, 625 for supplying electricity are exposed from the lens portions 614, 624. In this case, the lead 624 on the side of the second light source 62 is bent by about 90 degrees. With the first and the second light sources 61, 62 constructed of mold-type light-emitting diode, the same effect as in the fourth embodiment as described above can be expected.

When the mold-type light-emitting diode is used, positioning means for determining the orientation of the light-emitting portions 61a, 92a and the position thereof may be added. As such positioning means, a holder member may be specifically provided on the circuit board, or such a function as a holder member may be given to the reflector 700.

Though it is not shown, by arranging a semi-translucent panel of a dark color formed of a smoked material in front of the pointer 4 and the front panel 5, the light-emitting image of the display portion 52 and the pointer 4 can be displayed in the dark colored background in high contrast when the first and the second light sources 61, 62 are lighted up, thereby enabling enhancement of visibility and presentation of quality appearance.

In this embodiment, an example to illuminate both of the pointer 4 and the front panel 5 by the first and the second light sources 61, 62 is shown. However, the illuminating means for the pointer 4 is arbitrary as far as at least the front panel 5 is illuminated. On the other hand, though the instrument body 3 is disposed behind the circuit board 1 in the fourth embodiment, the instrument body 3 may be disposed in front of the circuit board 1 when the illumination of the pointer 4 is not specially considered.

Figure 15:
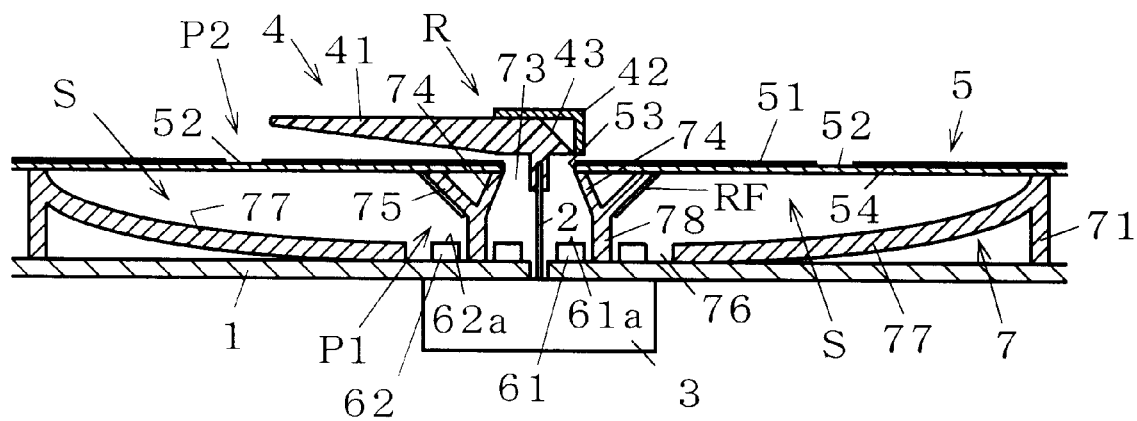
Figure 16:
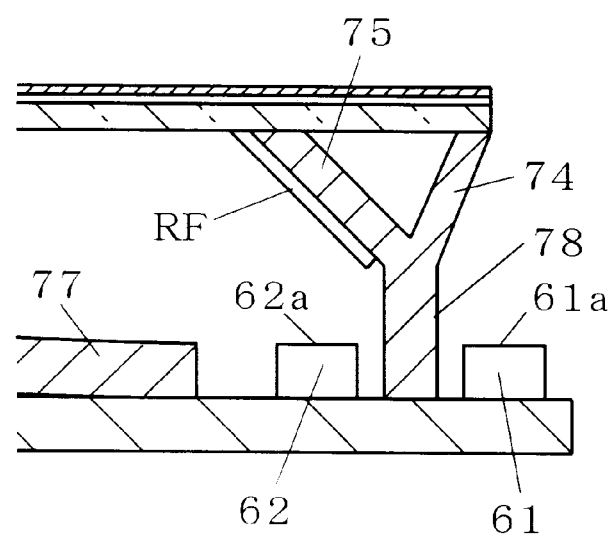
Figure 17:
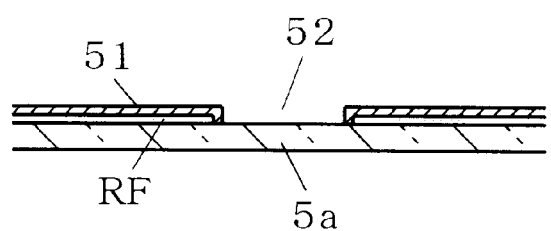

Referring now to FIG. 15 to FIG. 17, the sixth embodiment of the present invention will be described.

This embodiment is the same construction as the first embodiment described above, but reflecting film for enhancing the reflectivity of light is provided on the reflector and on the front panel.

In other words, in this embodiment, the front panel 5 is, as specifically shown in FIG. 17, a thin plate substrate 5a formed of a translucent synthetic resin having a light-blocking ground color portion 51 and a translucent display portion 52 composed of an extracted area on which a ground color portion 51 is not formed, in which the display portion 52 forms a scale, characters or markings arranged in an annular shape along the orbit of the pointer 4 so as to be an object of indication. A reflecting film RF is formed between the substrate 5a and the ground color portion 51. The reflecting film RF and the ground color portion 51 are respectively, for example, of printed layers formed by screen printing, and the color ink forming the reflecting film RF used here is for example of a whitish color ink, which is high in reflectance of light, and the color ink forming the ground color portion 51 use here is for example a blackish color ink, which is high in light absorptance and has a light-blocking property, and in this case, the reflecting film RF formed of printed reflecting layers is applied on almost the whole area of the substrate 5a so as to avoid the extracted area that serves as the display portion 52, to cover around the same, and to face to the second reflecting portion 77 of the reflector 7. Though the reflecting film RF may be formed on the back side of the substrate 5a, forming the same on the front surface of the substrate 5a as in this embodiment enables to enhance the smoothness of the surface of the back side of the reflecting film RF, which is the side where the light source 6 resides, thereby increasing light reflectivity. While the reflecting film RF is provided on almost the entire surface of the substrate 5a in this embodiment, it is also possible to provide only o n the desired area on the substrate 5a so that at least a part thereof faces to the second reflecting portion 77.

In this embodiment, as shown in FIG. 15 and FIG. 16, the first reflecting portion 75 of the reflector 7 is formed with a reflecting film RF on the wall surface facing to the second light source 62 along the surface configuration of the first reflecting portion 75. The reflecting film RF is formed, for example, of a reflecting layer in silver metallic color formed by vapor deposition of metal such as aluminum or the like, the surface of which is mirror-finished and has a higher light reflecting property than the base of the first reflecting portion 75 of whitish color, so that the illumination from the second light source 62 is strongly reflected outward.

As is described thus far, according to this embodiment, since reflecting films RF for enhancing the light reflecting property are provided on the first reflecting portion 75 and the front panel 5 respectively, the illumination from the second light source 62 is strongly reflected toward the outer periphery by the reflecting film RF on the side of the reflector 7, and the illumination reached the area of the front panel 5 other than the display portion 52 is efficiently reflected toward the back side of the front panel 5 by the reflecting film RF on the side of the front panel 5 so as to be reused for illuminating the display portion 52, whereby the reflectivity of light in the illumination chamber (in the airspace S) comprising the front panel 5, the first and the second reflecting portion 75, 77, the partition 74, the portion of the circuit board corresponding to the second light source 62 can be increased, thereby increasing the illumination supplied to the display portion 52 to increase the illumination luminance, and realizing almost uniform and bright illumination. In addition, the need for the components such as the light conductor or the diffusion plate for illuminating the front panel 5 can be negating, thereby achieving cost reduction and weight reduction. In addition, by the action of rendering the illumination uniform via the first and the second reflecting portions, the need for various dimming means such as complicated tuning operation (such as dimming mask printing or light diffusion printing on the front panel 5) of the illumination for rendering the illumination uniform or adjusting the balance can be negated or minimized, thereby achieving productivity improvement and cost reduction. Since a light-emitting diode is used as the light source 6, it is also preferable in terms of environment.

According to this embodiment, since the instrument body 3 is disposed behind the circuit board 1 to allow the drive shaft 2 to pass through the circuit board 1, the pointer 4 is constructed of a light-emitting pointer that emits a light upon reception of the light supply from the center of rotation thereof, the front panel 5 is formed with a through hole 53 for exposing the center of rotation R of the pointer 4, the first light source 61 for illuminating the pointer 4 is disposed on the front side of the circuit board 1 at the position corresponding to the through hole 53, the reflector 7 is provided with an opening 73 for passing the illumination from the first light source 61 toward the center of rotation R of the pointer 4, so that the pointer 4 is illuminated via the opening 73 and the through hole 53 of the front panel 5, the pointer 4 can be illuminated brightly together with the front panel. By illuminating the front panel 5 and the pointer 4 respectively by specifically provided first and the second light sources 61, 62, the quantity of light that reach the display portion 52 and the pointer 4 respectively can be increased to enhance the illumination luminance.

Though the example in which the front panel 5 and the pointer 4 are both illuminated is shown in this embodiment, the illuminating means for the pointer 4 is arbitrary as far as at least the front panel 5 can be illuminated, and when the illumination of high luminance is required for the pointer 4, the light-emitting pointer having, for example, a light source such as a light-emitting diode integrated in the pointer itself may be employed. Though the instrument body 3 is disposed behind the circuit board 1 in this embodiment, when the illumination for the pointer 4 is not specially considered, the instrument body 3 may be disposed in front of the circuit board 1.

Though both of the first reflecting portion 75 and the front panel 5 are provided with reflecting films RF in this embodiment, the reflecting film RF may be provided on either one of the first reflecting portion 75 and the front panel 5 according to the required illumination luminance or the like. Though it is also possible to provide the second reflecting portion 77 with this type of reflecting film RF, when forming a reflecting film on this portion, care must be taken for the light reflecting characteristics of the reflecting film, and thus selecting the reflecting film RF with low reflectivity and having light diffusion property is more advantageous for rendering the illumination uniform than selecting the reflecting film RF formed of a silver mirror surface as is formed on the first reflecting portion 75. If anything, when the second reflecting portion 77 is in whitish color as is in this embodiment, there is a case where the base of the second reflecting portion 77 is superior in terms of light diffusion reflectivity than the reflecting film, and thus the application of the reflecting film to this portion may be avoided.

Though the reflecting film RF on the side of the first reflecting portion 75 is determined to be a silver mirror surface and the reflecting film RF on the side of the front panel 5 is determined to be whitish color in this embodiment, the reflecting characteristics or the color of the reflecting films RF may be selected arbitrarily according to the required illumination luminance as far as formation of these films can increase the light reflectivity of that portion or of itself in comparison with the case where these films are not formed. For example, the reflecting film RF on the side of the front panel 5 is formed in a metal color or a metal colored mirror surface to further increase the illumination luminance, or the reflecting film RF on the side of the first reflecting portion 75 is formed in a metal color having less reflectivity than the mirror surface to suppress the illumination luminance.

Figure 18:
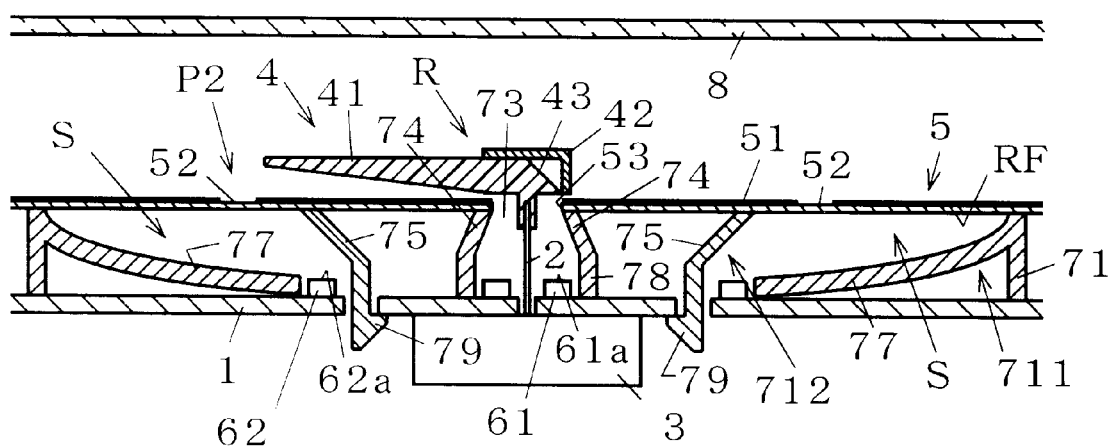
FIG. 18 is a cross sectional view of the instrument apparatus showing the seventh embodiment of the present invention.

Referring now to FIG. 18, the seventh embodiment of the present invention will be described. The different point of this embodiment from the sixth embodiment described above is that the reflector is divided into the first case body and the second case body, and the front side of the front panel including the pointer is covered by the semi-translucent panel of dark color.

In other words, the first case body 711 comprises a peripheral wall portion 71, a second reflecting portion 77, and a partition 74, and the second case body 712 comprises a first reflecting portion 75 and the hook portion 79 continuously provided, and in this case, the second cases body 712 is fixedly engaged with the circuit board 1 via the hook portion 79. In this case, the front panel 5 is provided with a reflecting film as in the case of the sixth embodiment.

The semi-translucent panel 8 is formed of a "smoked panel", through which the images of the pointer 4 and the display portion 52 formed by lighting up of the first and the second light sources 61, 62 are viewed, high contrast display such that the illuminated image is floating in the dark background is obtained.

As is described thus far, since the first reflecting portion 75 together with the second case body 712 is separated from the first case body 711, the same effect as in the sixth embodiment can be obtained, and in addition, when forming the reflecting film on the first reflecting portion 75, the formation thereof is facilitated, thereby improving the operability. Since the front side of the front panel 5 is covered by the semi-translucent panel 8 in a dark color, the illumination image can be displayed in high contrast, thereby giving a quality appearance to enhance the productivity in spite of its low cost and reduced weight. Division of reflector 7 or employment of a semi-translucent panel 8 as described above is applicable not only to this embodiment, but also to each embodiment of the present invention. When dividing the reflector 7, the partition 74 in addition to the first reflecting portion 75 can also be separated.

Figure 19:
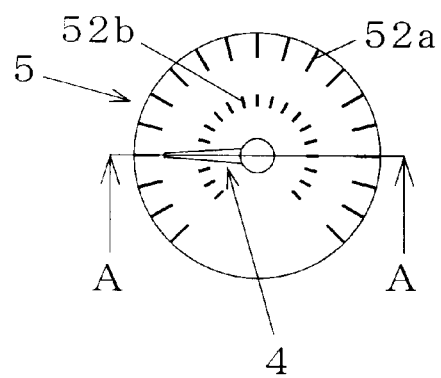
Figure 20:
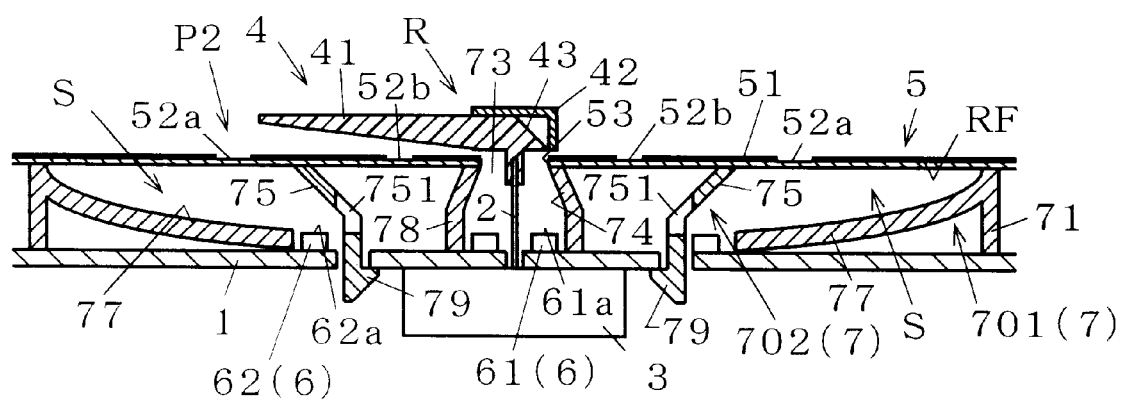

Referring now to FIG. 19, FIG. 20, the eighth embodiment of the present invention will be described.

In this embodiment, the front panel comprises a first display portion and a second display portion, wherein these display portions are illuminated respectively by the second light source.

In other words, the first display portion 52a, corresponding to the pointer 4, is a plurality of principal indexes comprising a scale, characteristics, and marks arranged in an annular shape, and the second display portion 52b, also corresponding to the pointer 4, is a plurality of auxiliary indexes including a scale, characteristics and marks arranged in a smaller annular configuration than the configuration of the first display portion 52a. The first display portion 52a is illuminated by the second light source 62 via the first and the second reflecting portion 75, 77 as the display portion in the first and the second embodiment described above, and the second display portion 52b is illuminated by the illumination from the second light source 62 leaked toward the front side via the hole portion 751 formed at the intermediate position between the first reflecting portion 75 and the wall portion extending from the first reflecting portion 75 toward the circuit board 1 along the arranged configuration of the second display portion 52b. The point that the front panel 5 is provided with a reflecting film RF is the same as the sixth and seventh embodiments.

In this arrangement, the first and the second display portions 52a, 52b can be illuminated by the first light source 62, whereby the need for providing the light source for illuminating the second display portion 52b separately is not required, thereby reducing the cost.

Though an example in which the second display portion 52b is constructed of an auxiliary indexed arranged in an annular configuration is shown in this embodiment, it is also possible to dispose a suitable numbers of characters or marks as appropriate at the prescribed locations on the front panel 5 in stead of the auxiliary indexes, so that they are illuminated through the hole portion 751.

Figure 21:
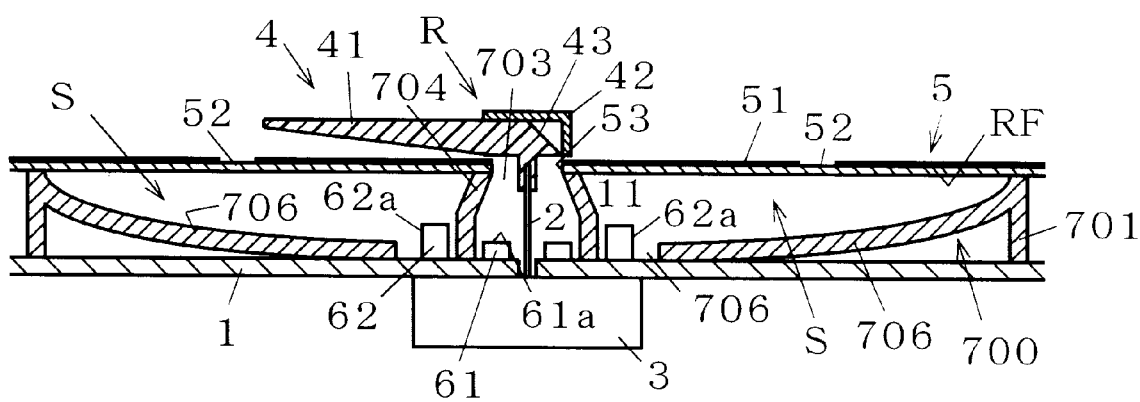
FIG. 21 is a cross sectional view of the instrument apparatus showing the ninth embodiment of the present invention.

Referring now to FIG. 21, the ninth embodiment of the present invention will be described.

In this embodiment, in addition to the same construction as the fourth embodiment, the front panel 5 is provided with a reflecting film as in the sixth to eighth embodiments, though it is not shown.

In this arrangement, not only the same effect as the sixth to eighth embodiments may be expected, but also further improvement of the illumination efficiency may be expected by illuminating the display portion 52 via the second light source 62 that emits the illumination directly toward the outer periphery by the light-emitting portion 62a facing to the opposite side from the drive shaft 2 and the reflecting portion 706 for reflecting the illumination from the second light source 62 toward the front panel 5.

INDUSTRIAL APPLICABILITY

The present invention is applicable not only to the instrument apparatus to be mounted on automotive vehicles, but also to the instrument apparatus to be mounted on various mobile bodies such as ships, airplanes, and the like.

What is claimed is:

1. An instrument apparatus as set forth in claim 1, characterized in that said instrument body is disposed behind said circuit board in such a manner that the drive shaft pass through said circuit board, in that said pointer is constructed so as to emit a light upon reception of the light supply from the center of rotation hereof, in that said front panel is formed with a through hole for exposing the center of rotation of said pointer, in that said light source is disposed at the position corresponding to said through hole, and in that said reflector includes an opening for allowing said illumination to pass toward the center of rotation of said pointer at the position corresponding to said through hole.

2. An instrument apparatus comprising: a circuit board; an instrument body disposed behind the circuit board and provided with a drive shaft extending through said circuit board to the front; a pointer fitted on the tip of said drive shaft for emitting a light upon reception of the light supply from the center of rotation; a front panel disposed between the pointer and said circuit board, and including a through hole for exposing the display portion corresponding to said pointer and the center of rotation of said pointer; a first light source disposed in front of said circuit board at the position corresponding to said through hole for illuminating said pointer; a second light source disposed in front of said circuit board, which is the outside of the first light source and the side where said drive shaft resides with respect to said display portion for illuminating said display portion; and a reflector disposed between said front panel and said circuit board, characterized in that said reflector includes an opening for allowing the illumination from said first light source to pass toward the center of rotation of said pointer at the position corresponding to said through hole, a first reflecting portion located outside of the opening to face to said second light source for reflecting the illumination from said second light source toward the outer periphery, and a second reflecting portion extending toward outside with an appropriate airspace interposed between itself and said front panel so as to surround said second light source for reflecting the illumination from said second light source toward said front panel.

3. An instrument apparatus as set forth in claim 2, characterized in that said reflector includes a partition surrounding said opening and extending in the direction of the axis of said drive shaft for separating said first light source and said second light source.

4. An instrument apparatus as set forth in claim 3, characterized in that said partition is provided with said first reflecting portion.

5. An instrument apparatus as set forth in claim 1, characterized in that said first reflecting portion is formed of an inclined surface or an inclined curved surface inclined by a prescribed angle with respect to said front panel.

6. An instrument apparatus as set forth in claim 5, characterized in that said inclined surface of said inclined curved surface is formed into a conical shape which surrounds said drive shaft.

7. An instrument apparatus as set forth in claim 1, characterized in that said second reflecting portion is formed of an inclined surface or an inclined curved surface that approaches to said front panel with the distance from the center.

8. An instrument apparatus as set forth in claim 7, characterized in that said inclined surface or said inclined curved surface is formed in such a manner that the inclined angle with respect to the front panel increase with the distance from the center.

9. An instrument apparatus as set forth in claim 1, characterized in that said first reflecting portion is formed separately from said reflector.

10. An instrument apparatus as set forth in claim 2, characterized in that a plurality of said first and second light sources are disposed on the concentric circles with said drive shaft as a center.

11. An instrument apparatus as set forth in claim 2, characterized in that the first light source and the second light source are different in color.

12. An instrument apparatus as set forth in claim 1, characterized in that said first reflecting portion is formed with a reflecting film.

13. An instrument apparatus as set forth in claim 1, characterized in that said front panel has a reflecting film facing to said second reflecting portion.

14. An instrument apparatus as set forth in claim 13, characterized in that said reflecting film is formed while avoiding said display portion.

15. An instrument apparatus as set forth in claim 12, characterized in that said reflecting film is in metallic color.

16. An instrument apparatus as set forth in claim 15, characterized in that the surface of said reflecting film is mirror-finished.

17. An instrument apparatus as set forth in claim 15, characterized in that said metallic color is silver.

18. An instrument apparatus as set forth in claim 1, characterized in that said instrument body is disposed behind said circuit board in such a manner that said drive shaft passes through said circuit board and extends forward.

19. An instrument apparatus as set forth in claim 1, characterized in that said reflector is formed of a whitish synthetic resin material.

20. An instrument apparatus as set forth in claim 1, characterized in that the wall surface of said reflector is formed into a glossy surface.

21. An instrument apparatus as set forth in claim 1, characterized in that said light source or said first and said second light sources comprise a light-emitting diode.

* * * * *

UNITED STATES PATENT AND TRADEMARK OFFICE
CERTIFICATE OF CORRECTION

PATENT NO.     : 6,595,667 B1
DATED          : July 22, 2003
INVENTOR(S)    : Masato Obata It is certified that error appears in the above-identified patent and that said Letters Patent is hereby corrected as shown below:

Column 20,
Lines 28 - 39, delete "An instrument apparatus as set forth in Claim 1" insert -- An instrument apparatus comprising: a circuit board; an instrument body disposed on the circuit board and provided with a drive shaft extending forward; a pointer to be fitted on the tip side of the drive shaft; a front panel disposed between the pointer and the circuit board and including a display portion corresponding to said pointer; a light source disposed at the position in front of the circuit board, which is the side of said drive shaft with respect to said display portion at least for illuminating the display portion, and a reflector to be disposed between said front panel and said circuit board; characterized in that said reflector includes a first reflecting portion facing to said light source for reflecting the illumination from said light source toward the outer periphery, and a second reflecting portion extending outwardly to cooperatively define a continuous airspace extending between substantially all of an upper surface of said second reflecting portion, a bottom surface of said front panel, and said light source, said first reflecting portion and said second reflecting portion being configured for reflecting said illumination toward said front panel, --

Signed and Sealed this

Thirteenth Day of April, 2004

JON W. DUDAS
*Acting Director of the United States Patent and Trademark Office*